June 6, 1933.  A. FERRAR  1,913,234
FILTER FOR MAUSOLEUMS
Filed March 22, 1930   2 Sheets-Sheet 2
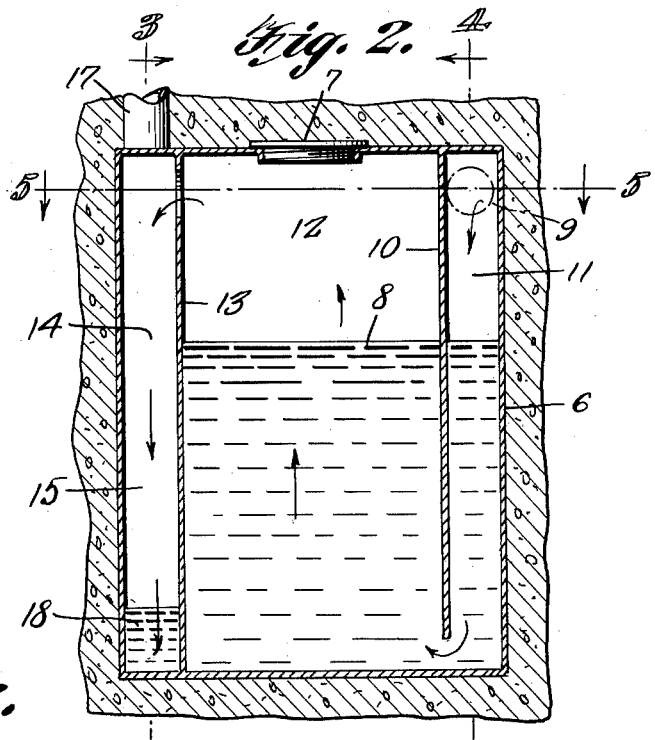
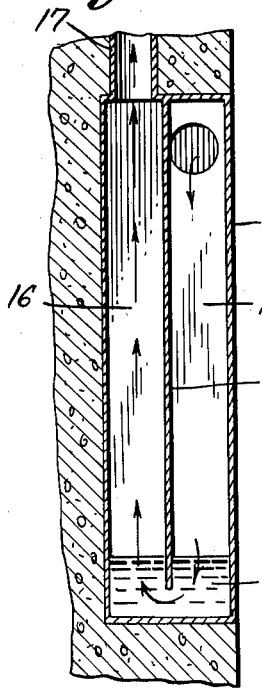
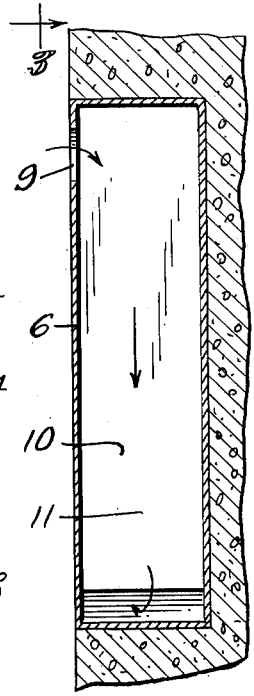
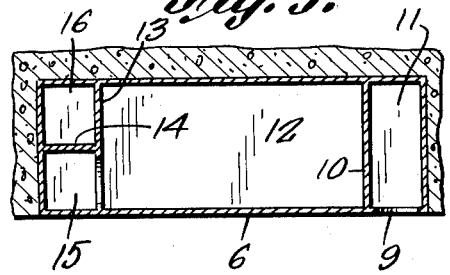
Albert Ferrar, INVENTOR
BY Victor J. Evans ATTORNEY Patented June 6, 1933

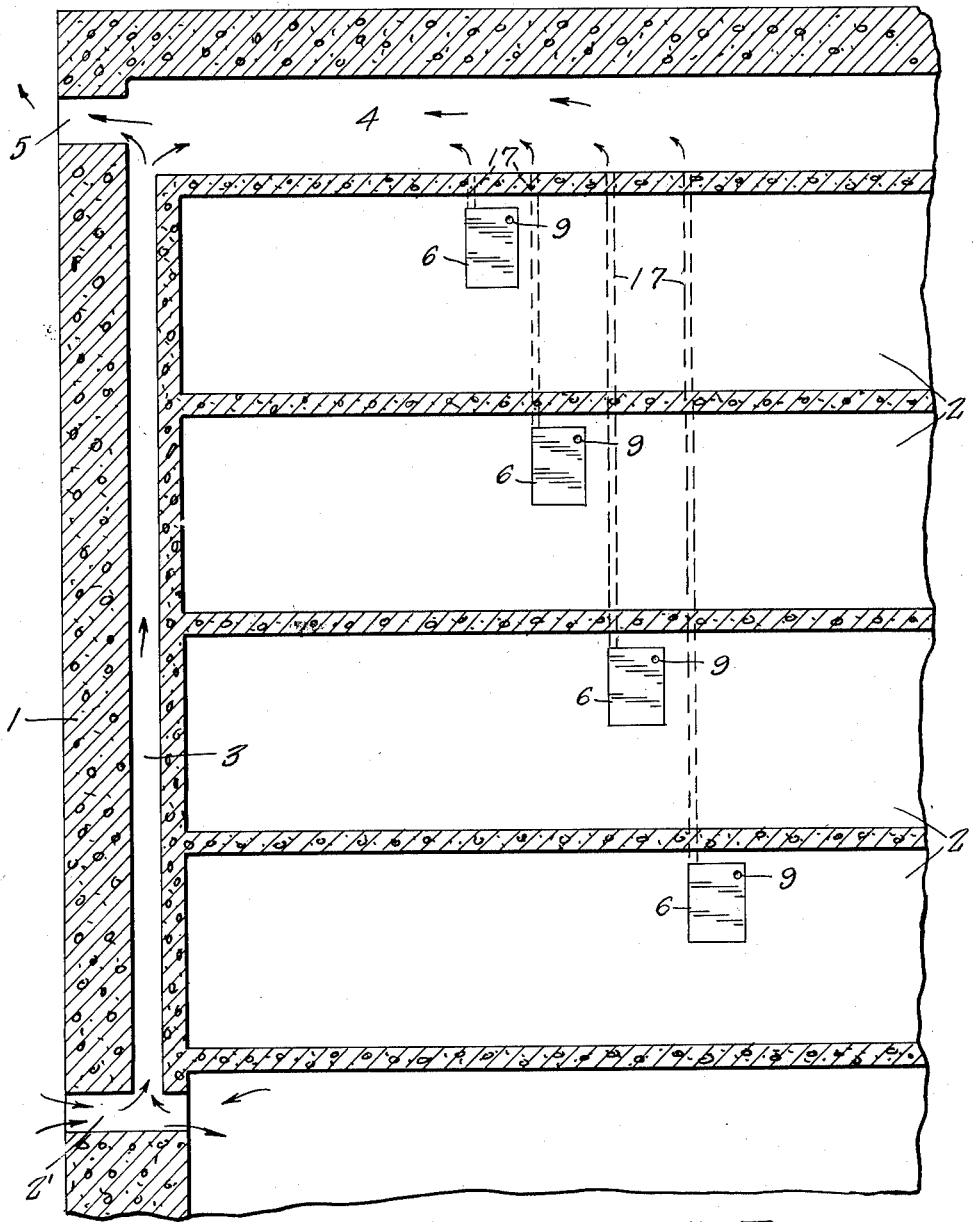

1,913,234

UNITED STATES PATENT OFFICE

ALBERT FERRAR, OF HARRISBURG, PENNSYLVANIA

FILTER FOR MAUSOLEUMS

Application filed March 22, 1930. Serial No. 438,175.

My present invention has reference to mausoleums and particularly to what is known as community mausoleums in which there are incorporated a number of crypts in a single structure and the primary object of the present invention is the provision of means whereby each crypt has arranged therein a filter for the outlet of gases, of a construction whereby such gases will be caused to pass through a disinfectant and likewise through a mercury seal before finding an outlet to the atmosphere, so that the gases will be purified before passing to the atmosphere.

To the attainment of the above broadly stated objects and others which will present themselves as the nature of the invention is better understood, reference is to be had to the drawings which accompany and form part of this application.

In the drawings:

Figure 1 is a sectional view through a mausoleum showing its crypts provided with filtering means in accordance with this invention.

Figure 2 is an approximately central longitudinal sectional view through one of the filters.

Figure 3 is a sectional view approximately on the line 3—3 of Figure 2.

Figure 4 is a sectional view approximately on the line 4—4 of Figure 2.

Figure 5 is a sectional view approximately on the line 5—5 of Figure 2.

Referring now to the drawings in detail it will be noted that a mausoleum 1, which is constructed of concrete or any other desired material is provided with any desired number of crypts 2. One of the vertical walls of the mausoleum is formed with a transverse air inlet passage 2' that communicates with the hollow bottom of the mausoleum and which passage communicates with a vertically directed passage 3 in the said wall of the mausoleum. The passage 3 communicates with the roof passage 4 and the wall of the mausoleum is provided with an air outlet passage 5 which communicates with the roof passage 4 and the passage 3.

In carrying out my invention I embed in one of the walls of each of the crypts 2 a substantially rectangular casing 6 that provides the body of the filter. Each casing is of copper or some other suitable non-corrosive metal and is provided at its top with an opening closed by a cap 7 whereby a formaldehyde 8 or other suitable disinfectant, either liquid or powder, may be received in the casing. The cap 7 is screwed tight after the casing is filled with the disinfectant.

Each casing, adjacent to its upper corner on its outer face is provided with an inlet opening 9 for the noxious gases from the crypt. Each casing has a baffle plate 10 extending from its side and disposed to one side of the opening 9. The baffle plate terminates a slight but suitable distance from the bottom of the casing and the baffle plate, together with one of the end walls of the casing provides a passage 11 for the gases, so that the said gases must pass through the disinfectant in the passage and in the body of the casing before finding an outlet therethrough. The gas will be purified in its passage through the disinfectant and find an outlet through the opening 12 in a partition plate 13 arranged between the top and bottom and connected to the ends of the casing 6 and disposed adjacent to the end of the casing opposite that provided with the passage 11. Secured to the top, the partition and the said second end of the casing there is a transverse plate 14 that terminates a slight but suitable distance above the bottom of the casing 6. This plate 14 divides the outlet end of the casing into two passages 15 and 16, respectively, and the purified gases must first pass through the passage 15 before finding an outlet through the passage 16. The top of each casing has secured thereto a pipe 17 which communicates with the passage 16 and likewise with the roof passage 4 in the mausoleum. The passages 15 and 16 have arranged in the bottom thereof a mercury seal 18 that closes the opening between the plate 14 and the passages 15 and 16. The mercury seal prevents the passage of back draft into the crypts. Noxious gases formed by decomposition and evaporation of liquids of dead bodies will have great force and raise the mercury seal and escape through the passage 16 and pipe 17, finding an outlet through the port or passage 5 in the mausoleum. The fresh air entering the passage 2 and traveling upwardly through the passage 3 creates a draft which forces the purified gases upwardly when passing out of the mausoleum through the passage 5.

The disinfectant containers may, as stated, be buried in the walls of the crypt or may be secured to the sides of the crypt. The improvement is of a simple construction and the casings or tanks may be filled when ready for use, the mercury seal being also placed in the filters when the same are to be used. The device contains no parts which are liable to become out of order. The seal is permanent and active even after more volatile disinfectants have been dissolved. The mercury not only prevents back drafts but prevents any outside air entering into the crypts and, as stated, the force of noxious gases generated inside the crypts and forced through the disinfectant and mercury seal will become purified before entering the atmosphere.

Having described the invention, I claim:

A filter for burial crypts, comprising an elongated casing having a filling opening in the top wall thereof, and through which a disinfectant is adapted to be placed in the casing, a partition depending from said top wall in close proximity to one of the side walls and defining a gas receiving passage having an intake opening adjacent the upper end thereof, a second partition arranged in close proximity to the other side wall of the casing and connecting the bottom and top thereof, and having a gas outlet opening adjacent its upper end, a plate projecting from the last mentioned partition at a right angle thereto and connecting the adjacent side wall of the casing, and defining spaced parallel passages, said plate terminating in spaced relation to the bottom of the casing to establish communication between said parallel passages, one of said passages communicating with said gas outlet opening in the second mentioned partition, and a liquid seal between said parallel passages.

In testimony whereof I affix my signature.

ALBERT FERRAR.